129,623

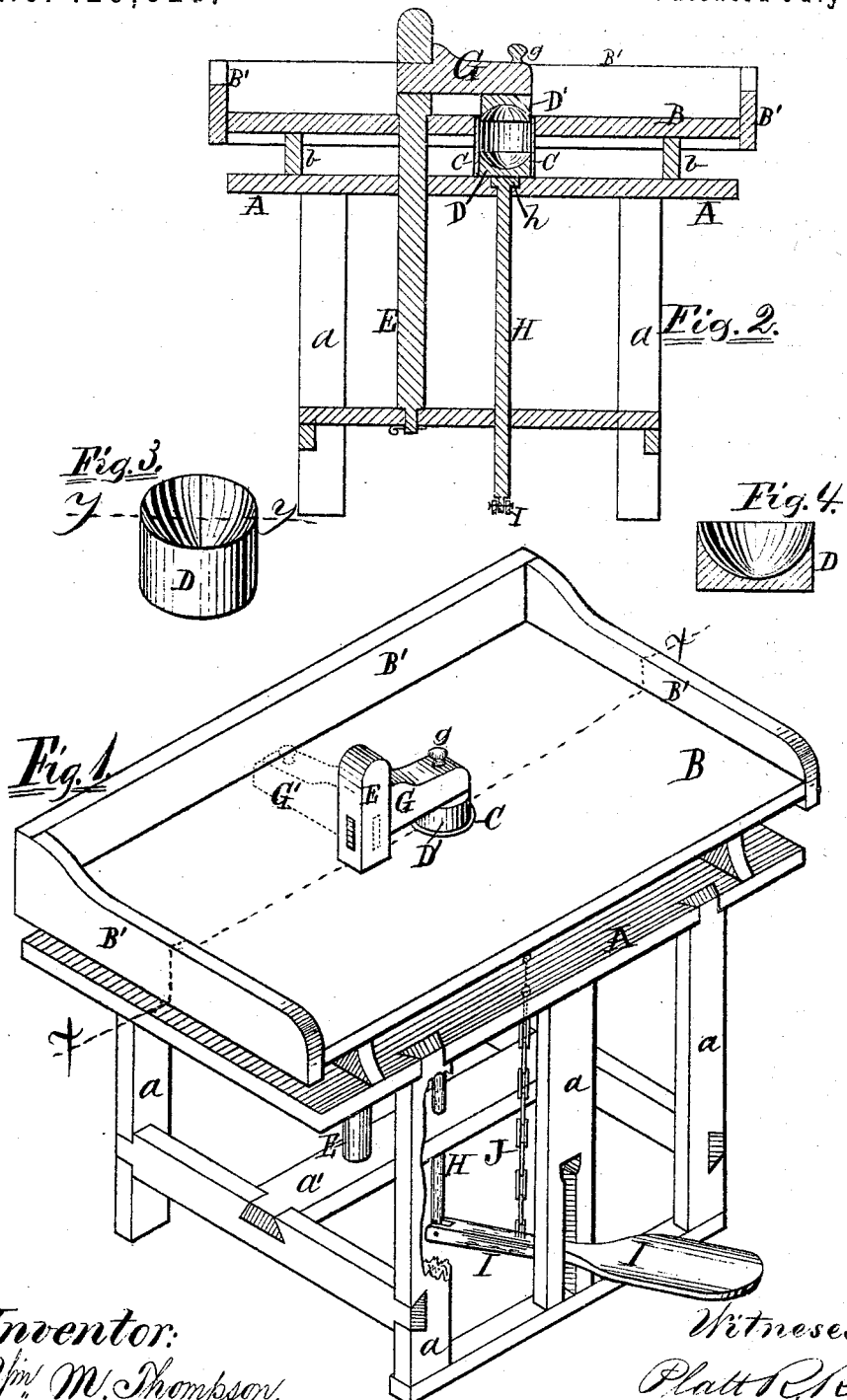

UNITED STATES PATENT OFFICE.

WILLIAM M. THOMPSON, OF MOLINE, ASSIGNOR OF ONE-HALF OF HIS RIGHT TO JACOB KEISER, OF ROCK ISLAND, ILLINOIS.

IMPROVEMENT IN MACHINES FOR FORMING POP-CORN BALLS.

Specification forming part of Letters Patent No. 129,623, dated July 16, 1872.

SPECIFICATION.

I, WILLIAM M. THOMPSON, of Moline, in the county of Rock Island and State of Illinois, have invented certain Improvements in Machines for Forming Pop-Corn into Balls or Cakes, of which the following is a specification:

The nature of my invention relates to improvements in machinery for forming pop-corn into suitable balls for marketing purposes; and the invention consists in the arrangement, with a suitable table for holding the prepared corn, of a cylinder in which two semi-spherical cups are made to compress the ball into the desired shape and size between them by the action of a foot-lever, all as hereinafter fully described.

Description of the Accompanying Drawing.

Figure 1 is a perspective view of a machine embodying my invention, showing one leg of the table partly broken away. Fig. 2 is a vertical sectional view of Fig. 1 on the plane of the line $x\ x$. Fig. 3 is a perspective view of one of the molds in which the balls are formed, and Fig. 4 is a sectional view of Fig. 3 on the plane of the line $y\ y$.

General Description.

A represents a table-top, supported on legs $a\ a\ a\ a$. B is an auxiliary top, supported a short distance above the top A by bars $b\ b$. B' B' B' are guards on three sides of the top B. C is a cylindrical tube passing through the top B, and resting with its lower end on the top A, in which position it is secured. D D' are cylindrical molds fitting neatly inside of the cylinder C, and having globular or semi-spherical cavities in one end of each, as shown plainly at Figs. 2, 3, and 4. E is a vertical shaft, with bearings in the table-top and in the cross-frame piece $a'$, and its upper end projecting above the table-top B. G is an arm, attached to and projecting outward, as shown, from the upper end of the shaft E, and a short distance above the top B. $g$ is a button on the arm G. H is a shaft, passing loosely up through the cross-frame piece $a'$ and bottom B, and provided with a disk, $h$, on its upper end. I is a foot-lever or treadle, pivoted at one end to the lower end of the shaft H, and near its central part to the lower end of a chain, J, suspended from the top A.

The operation of my invention is as follows: The corn, being popped may be prepared in the usual manner to cause the grains to adhere to each other when slightly pressed, are then placed in quantity on the top B, being held or retained there by the side pieces B'. The arm G being in the position shown by the dotted lines G', and the mold D being out of the cylinder C, the prepared corn may be scraped into the cylinder C until it is full, when the mold D' may be put in position, as shown at Figs. 1 and 2, and the arm G be brought round in position over it, as shown by full lines at same figures; now, by pressing on the outer end of the treadle I, the shaft H will be driven upward, thereby driving the mold D upward and compressing the corn between it and its fellow mold D'. Now, by taking hold of the button $g$, the arm G may be again swung to the position shown by dotted lines G', and the upper mold D' removed, and the ball of prepared corn removed. Any desired shape may be given the balls of corn by means of different-shaped molds, and the degree of pressure regulated by the length of the cylinder C and molds D D'.

Claim.

The cylinder C and molds D D', when arranged to operate with the table A B, shaft E with arm G, shaft H, and treadle I, substantially as described, and for the purpose specified.

WILLIAM M. THOMPSON.

Witnesses:
 JAS. H. PATTEE,
 A. A. RICE.